United States Patent [19]

Evetts et al.

[11] 4,282,589

[45] Aug. 4, 1981

[54] CORRELATION RANGING

[75] Inventors: Samuel G. Evetts, Dallas; John D. Lawson, Carrollton; William D. Penn, Dallas, all of Tex.

[73] Assignee: Texas Instruments Incorporated, Dallas, Tex.

[21] Appl. No.: 153,780

[22] Filed: Nov. 16, 1961

[51] Int. Cl.³ .............................................. G01S 15/58
[52] U.S. Cl. ...................................... 367/90; 367/100; 367/101; 343/100 CL
[58] Field of Search ...................... 343/8, 9, 100.7, 13, 343/17.1, 17.2; 340/3, 5 S, 1; 367/90, 100, 101

[56] References Cited

U.S. PATENT DOCUMENTS

| | | | |
|---|---|---|---|
| 2,476,032 | 7/1949 | Feldman | 367/91 X |
| 2,580,148 | 12/1951 | Wirkler | 343/100 CL |
| 2,676,317 | 4/1954 | Purington | 367/101 X |
| 2,690,558 | 9/1954 | Harvey | 343/104 |
| 2,743,438 | 4/1956 | Page | 367/90 |
| 2,817,832 | 12/1957 | Mathes | 367/101 |
| 2,860,331 | 11/1958 | Pridmore et al. | 343/9 |
| 2,926,243 | 2/1960 | Camp | 343/100 CL |
| 3,064,234 | 11/1962 | Barrett | 367/101 |

OTHER PUBLICATIONS

K. W. Goff, "An Analog Electronic Correlator for Acoustic Measurements," *Journal of the Acous. Soc. of Amer.*, vol. 27, No. 2, Mar. 1955 (pp. 223-236).

*Primary Examiner*—Richard A. Farley
*Attorney, Agent, or Firm*—Rene' E. Grossman; Melvin Sharp; James T. Comfort

EXEMPLARY CLAIM

1. In sonic ranging the method which comprises transmitting a first sonic pulse having a predominant frequency in the upper sonic range, transmitting a second sonic pulse after a time delay substantially less than the length of said first sonic pulse where said second sonic pulse has a frequency in the upper sonic range but substantially different than the frequency of said first sonic pulse, separately sensing the return echoes of the sonic pulses in two frequency bands to produce a pair of received signals, a first of which includes components representative of echoes of said first sonic pulse and the second of which includes components representative of echoes of said second sonic pulse with the frequencies of the echo components modified relative to the frequencies of said sonic pulses in dependence upon the relative velocities between the point of transmission thereof and the object producing echoes, separately recording said pair of received signals, reproducing the recorded signals to generate a pair of high frequency signals respectively representative of the first and second received signals with the first high frequency signal shifted in time relative to the second high frequency signal by an amount representative of said time delay to bring like components thereof into time coincidence, generating a timing function which varies monotonically from a predetermined level occurring in known time relative to the instant of transmission of the second of said sonic pulses, generating a pair of reference signals which vary in frequency in dependence upon said timing function, separately mixing said reference signals and the first and second of said high frequency signals to produce side band components, filtering said side band components to generate a pair of output signals of narrow band width centered at frequencies respectively representative of the frequencies of said sonic pulses, separately detecting said output signals to produce a pair of demodulated signals, and from the product of said demodulated signals generating a signal appearing along a time scale dependent upon said timing function.

6 Claims, 5 Drawing Figures

CORRELATION RANGING

This invention relates to range searching and more particularly to ranging pulse correlation.

In the art of sonic ranging, commonly known as "sonar", identification and location of a given reflecting object or target within a sonic range are often ambiguous and data is indefinite by reason of the presence of extraneous noise. Various methods and systems have been devised for improving sonar to enhance the resolution but substantial problems still remain.

Three problems most pressing in many sonar systems are limited range, limited search rates and limited detection probabilities. To overcome the same the present invention involves a technique of signal enhancement by utilizing narrow bandwidths together with pulse correlation. The present system may be characterized as narrow band doppler-frequency scanning sonar. More particularly, two signals with a measured time delay between them are employed. The time delay is substantially less than the time required for echoes resulting from pulse transmission to return to a detecting station. The return echoes are processed by frequency multiplication and correlation to provide a significantly increased detection probability and significantly increased range. At the same time the target range rate is determined by frequency scanning the returned signals or echoes.

The appellation "ping-pong sonar" is applied to one embodiment of the present invention to describe the use of a first sonic pulse of a first frequency referred to as a "ping" followed immediately by a second sonic pulse of a second frequency or a "pong". The ping and the pong echoes are separated for application to two processing channels wherein the echoes are correlated.

In a further aspect of the invention, provision is made for determining uniquely the velocity of a target relative to a sending station. This is accomplished through an improved mode of scanning the received signals. The received signal as compared with the transmitted signal is modified in accordance with the doppler effect. A frequency scanning technique is employed utilizing the received signal for accurate measurement of the target range rate.

A further aspect of the invention relates to the simultaneous presentation of target range and range rate.

More particularly, the return echoes of a plurality of pulses transmitted from a sending station are modified in accordance with the doppler effect. The frequencies of the received signals are then multiplied to transform them into signals in the radio frequency range. At such frequencies the signals each are applied to a hetrodyne scanning spectrum analyzer. The analyzer sweeps through a range of frequencies, which range is selected in dependence upon the doppler effect so that there will be provided an output impulse which is fixed in time relative to the beginning of the sweep of the reference voltage by the relationship between the frequencies of the sweep and the frequency of the doppler modified echo signals. Thus a signal is produced which is representative of target range and dependent upon range rate, i.e., the distance between the sending station and the target and the relative velocities therebetween.

In a preferred embodiment of the invention a selective time delay system is employed for the transmission of multiple pulses which are frequency-coded to permit separation and identification of the resulting echo signals. Filters are employed to separate the received signals into separate channels. The signals in the separate channels are stored or delayed so that echoes from a single target are in time coincidence. The effective pulse repetition rate is thus increased and the rate of information retrieval is correspondingly increased. In addition to increasing the detection probability by utilizing multiple signals and correlating them, a doppler frequency scanning system is provided in a preferred embodiment of the invention for a spectrum analysis of the dopplerized echoes. Output signals from two or more channels wherein such spectrum analysis is performed are then applied of the inputs to a multichannel multiplying system which may broadly be referred to as a correlator detector. Only the simultaneous presentation of signals to all inputs to the detector will produce an output signal which is keyed as to the relative velocity between the points of transmission of the acoustic pulses and the target.

For a more complete understanding of the present invention and for further objects and advantages thereof, reference may now be had to the following description taken in conjunction with the accompanying drawings in which.

Figure 1:
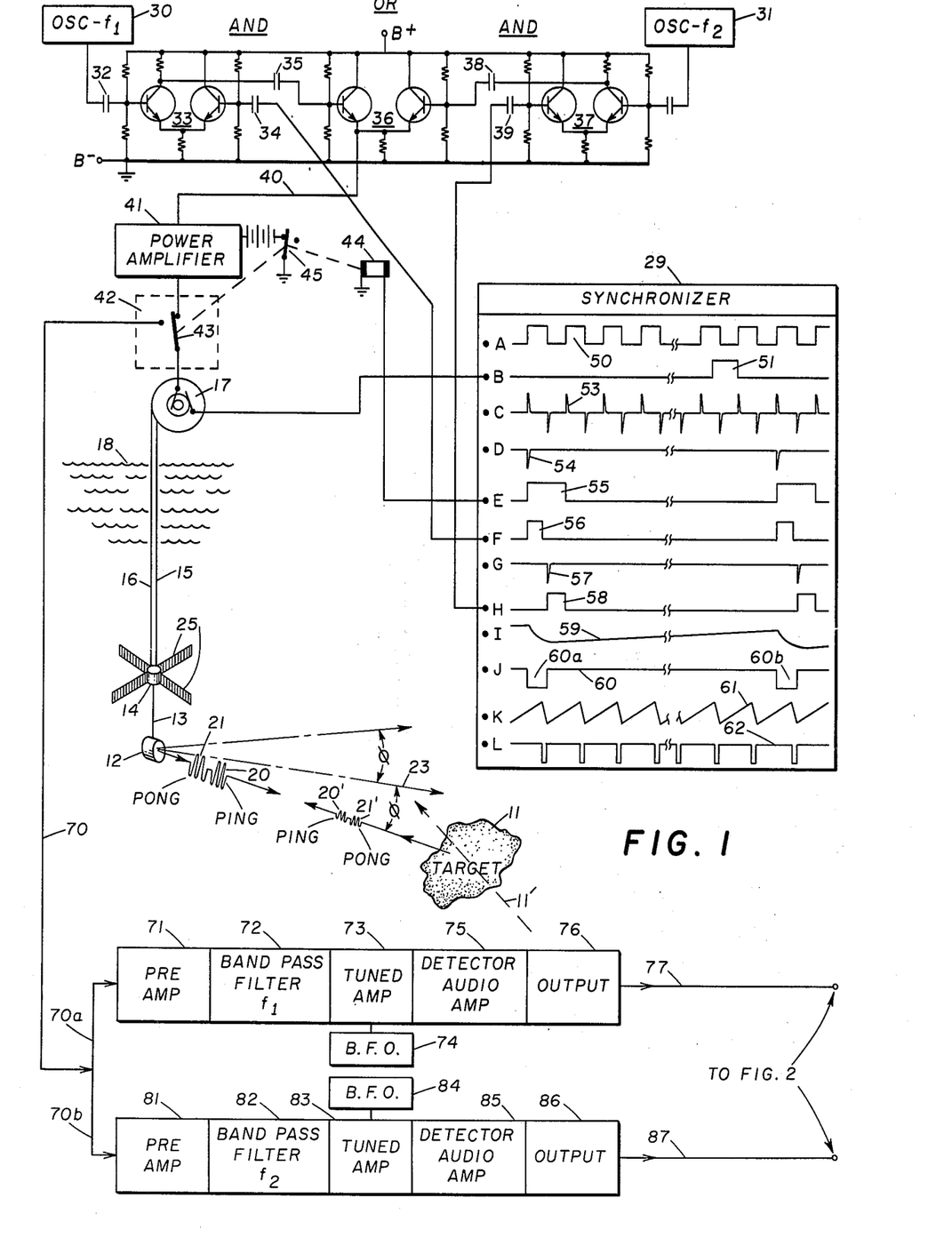
FIG. 1 is a diagrammatic illustration of a part of a system embodying the present invention.
Figure 2:
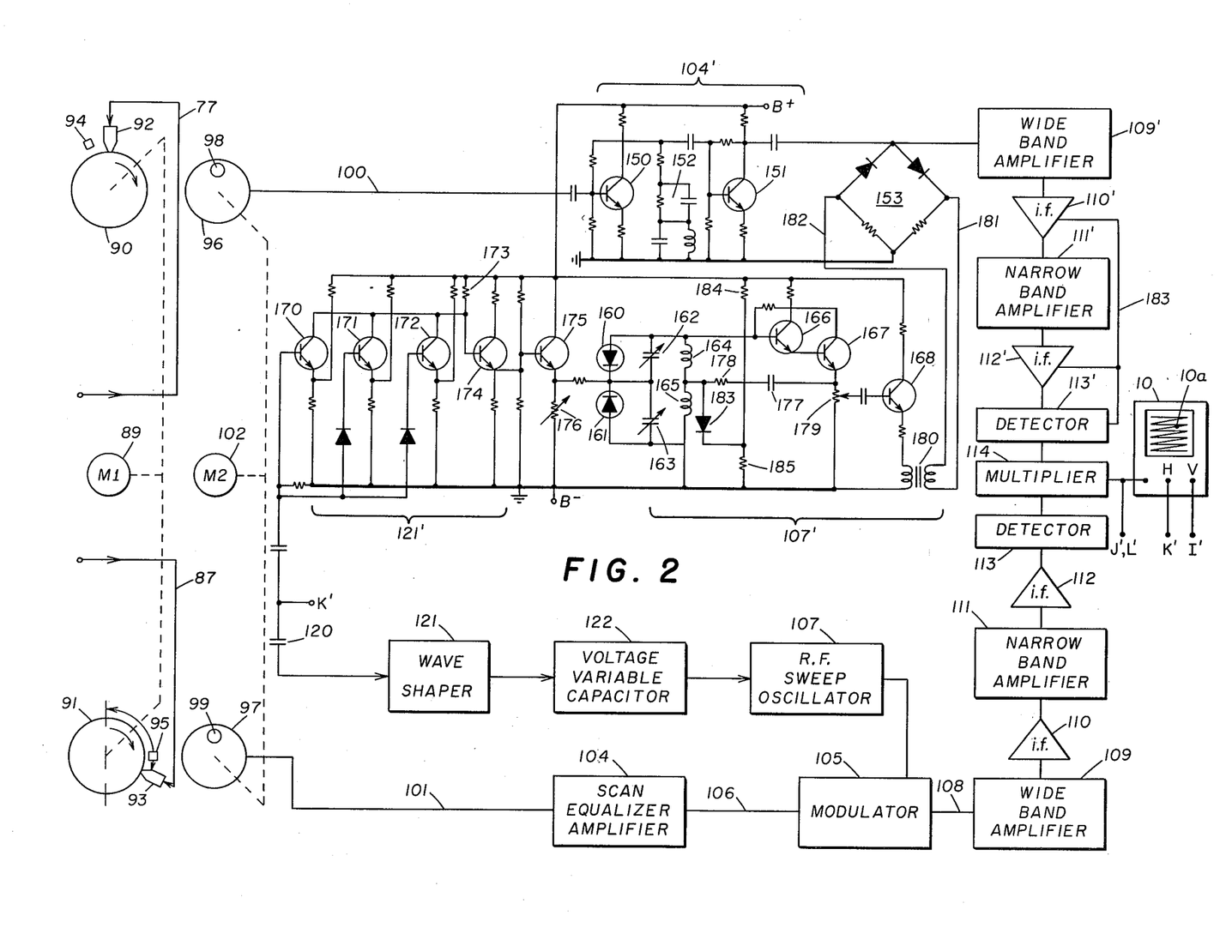
FIG. 2 is a schematic diagram partly in block form of the remainder of the system of FIG. 1.

Referring now to FIGS. 1 and 2, there is illustrated a system, partly in block diagram form and partly in detailed schematic form, for providing a presentation on an oscilloscope 10 which represents the range and the range rate of a target 11 relative to a transducer 12. There is to be presented repetitively on the face of the oscilloscope 10 a spot such as the spot 10a. The position of the spot from the bottom of the raster is to be in terms of the distance between the target 11 and the transducer 12. The distance of the point 10a from the center line of the oscilloscope face is to be in terms of the relative velocity between the target 11 and the transducer 12.

The embodiment of the invention shown in FIGS. 1 and 2 and now to be described is based upon the repetitive transmission of a pair of acoustic pulses of different but constant frequency oscillations.

A transducer 12 is coupled by a linkage 13 to a driver-stabilizer unit 14 which in turn is supported by a cable, including channels 15 and 16, leading to a reel 17. In practice, the reel 17 will be supported at or above the surface of a water level 18 as by means of a helicopter or ship or the like. In a most useful mode of operation the transducer 12 is lowered from a helicopter at a selected location over a water-covered area. At such location a series of measurements are made to sense the presence, the location and velocity of a submerged object, a submarine or the like, forming the target 11, relative to the transducer 12. In this embodiment of the invention the transducer 12 is repeatedly energized to produce a pair of pulses. The first pulse 20 is immediately followed by a pulse 21. The pulses 20 and 21 are in the upper audio frequency range. Preferably they are of different frequencies. By way of example, pulse 20, a first pulse, hereafter referred to as a "ping", would have a frequency of 21.5 kilocycles per second. The subsequent pulse 21, a "pong" pulse, would have a frequency of 19.5 kilocycles. The pulses are beamed from the transducer 12 which preferably is highly directional so that the cone of influence is fairly limited. The two pulses then travel to any target within the zone, such as target 11, where the pulses 20 and 21 are reflected. The ping and pong echoes 20' and 21" then travel back to the transducer 12 where they are detected for utilization in the data processing system hereinafter to be described. Following each search cycle, including transmission of at least one pair of pulses and detection of echoes thereof, the unit 14 is energized to rotate the transducer 12 through an angle such as angle $\phi$ so that a subsequent search cycle will be beamed in a new direction such as along axis 23. In practice, angles of 5° have been found to be satisfactory. An azimuthal angle of 360° is periodically probed by stepping any transducer 12 in 5° steps. The unit 14 includes a plurality of vanes such as the vanes 25 which serve as stabilizers, permitting the transducer 12 to be moved by rotation of the linkage 13 in fixed increments or steps.

The transducer 12 may be of any of the well-known devices which are adapted to transmit as well as to receive acoustic energy in a relatively narrow cone of influence. The transducer 12 is excited for the transmission of the pulses 20 and 21 from a source including oscillators 30 and 31 which runs continuously at output frequencies of 21.5 kilocycles and 19.5 kilocycles.

Oscillator 30 is connected by way of capacitor 32 to a first input of a coincidence amplifier 33. The second input to amplifier 33 is applied by way of coupling capacitor 34 which is connected to the output terminal F of a synchronizer 29. The coincidence amplifier 33 may be considered to be a transistorized and-gate wellknown both as to construction and operation. The output signal from the and-gate 33 is derived from the collector electrode of the input stage. The output is transmitted by way of coupling capacitor 35 to the input of a buffer stage which will be recognized as a conventional or-gate 36.

The circuit leading from the oscillator 31 is identical to that leading from oscillator 30, being connected through the and-gate 37 by way of the coupling condenser 38 to the second input terminal of the or-gate 36. The second input signal to the and-gate 37 is applied from the H terminal of synchronizer 29 by way of the coupling condenser 29.

The signal output from the or-gate 36 is transmitted by way of channel 40 to the input of a power amplifier 41. The output of the power amplifier 41 then is applied to a duplexer unit 42 which is diagrammatically represented by switch 43. Switch 43 is connected to one cable channel 15 by way of suitable brushes on the reel 17. By this means signals from the power amplifier 41 are applied to the transducer 12.

The control of the and-gates 33 and 37 and the or-gate 36 by synchronizer 29 is such that the pulses 20 and 21 are each 50 milliseconds long with the time interval between the pulses equal to 12.5 milliseconds.

The synchronizer 29 has been shown in block form only and preferably will include a frequency standard such as a regulated oscillator to provide a preset time base for the control of all the timing operations in the system. A plurality of distinct control functions are produced in and utilized from the synchronizer 29. The principle control functions have been illustrated both as to waveform and their time relationships on the face of the synchronizer 29. It is to be understood that electrical functions corresponding with such waveforms are available at the output terminals A-L. Some of such waveforms are used internally by the synchronizer. However, where they are used externally the electrical connection in some cases has been omitted for convenience in illustration with terminal points to which such signals are to be applied at points in the circuit other than on the synchronizer 29 being identified by the corresponding labels A'-L'.

The waveforms illustrated in FIG. 1 represent one cycle of operation of a particular embodiment of the invention. The cycle covers a time interval of several seconds depending upon the range selected as hereafter described. The synchronizer 29 includes a timing oscillator regulated as to frequency. Its output is modified to provide output timing pulses in the form of the sqaure waves 50. The length of each pulse is 62.5 milliseconds. The waveform 50 serves as a timing base for operation of the system.

The waveform appearing at terminal B includes an energizing pulse 51 which is applied by way of the reel 17 and channel 16 to the unit 14 preferably near the end of each cycle to step the transducer 12 from one position to another. The waveform 50 which may appear at terminal A is differentiated to produce the series of positive and negative gating pulses 53. A selected one of the pulses 53 which appears after each of the pulses 51 is then employed as at the terminal D to initiate a new cycle of operations.

In each such cycle there first is generated a gating pulse about 125 milliseconds long which appears at terminal E which is connected to the solenoid 44 controlling switch 43 and a second switch 45. The energization of relay coil 44 enables the amplifier 41 to amplify signals from oscillators 30 and 31 for transmission by way of switch 43 to transducer 12. At the same time the switch 43 closes the circuit between the power amplifier 41 and the reel 17.

Also produced, at terminal F, is a gating pulse 56 which is transmitted by way of the coupling condenser 34 to the and-gate 33. The gating pulse 56 is of duration of 50 milliseconds. Following the trailing edge of the pulse 56 by 12.5 milliseconds there is produced a further gating pulse 57 which serves internally of the synchronizer 29 to produce a control pulse 58 which is applied by way of coupling condenser 39 to the and-gate 37 for transmission of the pong pulse from oscillator 31.

Coincident with the leading edge of the pulse 58 there is initiated the vertical sweep voltage having waveform 59. The sweep voltage appears at terminal I and is applied to the vertical sweep input terminal on the display device 10.

There also is produced a cathode-ray blanking signal 60 which has negative pedestals 60a and 60b which serve to blank the cathode-ray at the end of each vertical scanning cycle.

A horizontal sweep voltage represented by the waveform 61 also is produced by synchronizer 29. The horizontal sweep voltage 61 is of much higher repetition rate than the vertical sweep so that there is produced a raster on the display device 10. The raster is of relatively low frequency, sweeping vertically over an interval dependent upon the range to be explored. For a range of 6,000 yards the vertical sweep voltage 59 has a period of about 15 seconds.

The start of each horizontal sweep voltage cycle coincides with the trailing edge of each of the positive pedestals in the waveform 50. The period of the horizontal sweep is 125 microseconds. During the flyback interval in each horizontal sweep voltage cycle, a blanking pulse is produced. Such blanking pulses are represented by the waveform 62.

Thus far described is the energization of the transducer 12 for the production of the pulses 20 and 21 together with the waveforms in the synchronizer 29, the use of which will now further be explained in connection with processing of received pulse data. At the end of the waveform 55 the duplexer 42 effectively connects the transducer 12 to a receiver channel 70. The receiver channel 70 is connected to two data channels 70a and 70b. The first channel 70a includes a preamplifier 71 and a band-pass filter 72 which is tuned sharply to the frequency of oscillator 30, thus passing only frequencies at or closely adjacent to 21.5 kilocycles. Channel 70a then includes a tuned amplifier 73 to which there is connected a beat-frequency oscillator 74. By heating the information signal from channel 70a with the signal from oscillator 74, the information is translated to a frequency in the low audio range. A detector and audio amplifier stage then follow comprising the unit 75 which in turn is followed by an output unit 76.

In a similar manner, the second channel 70b is provided with a preamplifier 81 and a band-pass filter 82 which is sharply tuned to 19.5 kilocycle signals. The channel 70b oscillator 84 connected thereto. The signal then passes through a detector and audio amplifier unit 85 where it is detected and has a low audio frequency signal which is applied to the output stage 86.

It will be recognized that one purpose of the present system is to determine how far the target 11 is from the transducer 12. A second purpose is to determine the velocity of the target 11 relative to the transducer 12. It is well-known that the frequency of the return echoes 20' and 21' will differ from the frequency of the transmitted pulses 20 and 21 in dependence upon the velocity of the target 11. The doppler effect is well-known. For ranges of relative radial velocity components between the target 11 and the station 12 from +30 knots to −30 knots, the range of signal frequencies expected at the output of detectors 75 and 85 would be of the order of from about 400 to 1200 cycles per second. In general, the target 11 may be traveling along a path such as path 11'. If the radial component of velocity of the target 11 is zero, then the frequencies of the beat-frequency oscillators 74 and 84 are selected with reference to the frequencies of the signals from oscillations 30 and 31 such that the output frequency at the detectors 75 and 85 would be 800 cycles. If the target 11 is moving directly toward the transducer 12 at a rate of 30 knots, then the frequency of the signals as they appear at the detectors 75 and 85 would be of the order of 1200 cycles per second. If the target 11 is moving directly away from the transducer 12 at 30 knots, the signals from detectors 75 and 85 would be of the order of 400 cycles per second. The band-pass filters 72 and 82 respectively select frequencies $f_1$ and $f_2$ of oscillators 30 and 31 as doppler modified. The ping and the pong echo pulses are channeled separately through a correlating system hereinafter to be described so that they may be utilized to enhance the signal-to-noise ratio.

The noise level at the transducer 12 may be sufficiently high to obscure any reflections from target 11. It would be desirable regardless of noise levels within the ranges encountered to be able to extract the reflection data, the information signals, from the noise-signal combination and utilize such data to provide the positive identification of range and/or range rate.

The present invention has been found to provide considerable improvement in this direction.

The signals 20 and 21 are accompanied by different noise spectra by reason of the time displacement therebetween and because of the difference in the frequencies of the transmitted pulses. This difference is utilized in a correlation system to permit enhancement of the signal-to-noise ratio. This is accomplished, as will be explained in connection with FIG. 2, by the utilization of the relatively low frequency audio signals appearing at the output stages 76 and 86.

The beat-frequency oscillators 74 and 84 and detectors 75 and 85 were employed to reduce the effective frequencies of the information signals to frequencies suitable for recording on a relatively low speed magnetic recording medium. The signals recorded magnetically are then multiplied in frequency to be in a frequency range considerably higher than the frequencies of pulses 20 and 21. At such frequencies they may be treated positively as well as more conveniently than at low frequencies to extract data peculiarly related to the reflection phenomena at the target 11.

More particularly, referring to FIG. 2 a dual recording system employs a pair of magnetic drums 90 and 91 on which signals from channels 77 and 87 are stored. Drums 90 and 91 are driven as a single unit by a motor 89. Motor 89 drives the drums at a relatively low speed. The speed of motor 89 is selected with due reference to the frequency of the signals from the channels 77 and 87, or vice versa.

The channels 77 and 87 leading from the units 76 and 86, respectively, are connected to recording heads 92 and 93, respectively. The recording heads 92 and 93 are displaced one with respect to the other by an angle which is sufficient to compensate for the time delay of 62.5 milliseconds between the leading edges of pulses 56 and 58. By this means there may be recorded in relative time coincidence on the drums 90 and 91, the components of the input signals to the recording heads 92 and 93 which are representative of the return echoes 20' and 21'.

The signals recorded on the drums 90 and 91 are continuously recorded and are erased by erase heads 94 and 95 which are positioned immediately ahead of the record heads 92 and 93, respectively. Information stored on the drums 90 and 91 is continuously scanned at a high rate by scanning disks 96 and 97. The scanning disks each include at least one reproducing head such as the heads 98 and 99 which produce signals on the output channels 100 and 101, respectively, which signals include components representative of the return echoes 20' and 21'. However, the scan disks 96 and 97 are driven by a motor 102 which rotates them at a very high speed so that the frequencies of all components of the return echo signals 20' and 21' are highly multiplied. More particularly, the signals recorded on the drums 90 and 91 are in the range of from about 400 to 1200 cycles per second whereas the corresponding signals appearing on channels 100 and 101 will be in the range of from about 15 to 50 kilocycles. By this means the audio signals from the receiver channels 77 and 87 of FIG. 1 are multiplied into ultrasonic signals by the frequency multiplier-recorders.

In one embodiment of the invention the frequency multiplication was obtained by recording the audio signals on a magnetic drum revolving at 295 revolutions per minute and scanning the recorded signal at 12,000 revolutions per minute. The ratio of the speeds produced a multiplication factor of 40.6:1. An audio output of 391 to 1209 cycles per second (for the expected target speed of up to ±30 knots) such as would be received on channel 77 from the 19.5 kilocycle pulses was increased to a range of frequencies of from 15.89 to 49.0 kilocycles. The other signal appearing on channel 87 was similarly raised in frequency. At the same time, by reason of the displacement as between the record heads 92 and 93, the first echo signal components from echo 20' were delayed to coincide with the echo signal components from echo 21'.

Treatment of signals from the drum units 90 and 91 will first be described in connection with channel 101 shown in block form and comprising a spectrum analyzer. Signals on channel 101 are amplified and equalized in the equalizer amplifier 104 for distortion due to the recorder. They are than transmitted to a modulator 105 where the incoming signal on channel 106 is mixed with a variable frequency signal from a sweep oscillator 107. The spectrum analyzer sweep oscillator 107 is synchronized with the horizontal sweep voltage 61 of FIG. 1 to vary, for the above example, from 207.89 to 241 kilocycles. As the output from the sweep oscillator 107 sweeps through this range, signals appearing at the input channel 106 having frequency components within the 15.89 to 49.0 kilocycle band are scanned and would produce a frequency difference signal at the output channel 108 of the modulator 105, the lower side band being selected by the succeeding narrow band components of the system which are tuned to 192 kc. Since the sweep oscillator 107 is synchronized with the horizontal sweep voltage applied to the display device 10, it repeatedly sweeps the range of frequencies which may be possible within the doppler region.

The output of the modulator 105 then is applied through a wide band amplifier 109 tuned fairly broadly to 192 kc., then to an intermediate frequency amplifier 110, a narrow band amplifier 111 tuned sharply to 192 kc., an intermediate frequency amplifier 112 and a detector 113. The output from detector 113 is in the nature of a pulse which appears when the difference between the frequency of the time variable sweep voltage and the signal component frequency is equal to 192 kilocycles per second.

The pulse output from unit 113 is positioned in time with reference to the beginning of the vertical sweep voltage in proportion to the time of travel of pulses 20 and 21 from the transducer 12 to target 11 and back. The pulse output is positioned in time with reference to the horizontal sweep voltage in dependence upon the relative velocity between the target 11 and the transducer 12.

The pulse output from the detector 113 is applied to a first input terminal of a multiplier 114 whose output is connected to the intensity control input of the display device 10. When a signal is applied from channel 100 to the second input terminal of multiplier 114 in time coincidence with the signal from detector 113, then a spot will appear on the raster in display device 10 which will indicate directly both the range and the range rate as sensed by the ping-pong pulses of FIG. 1.

The received pulses or the echo signals 20' and 21' have different noise spectra and the recording and playback systems for frequency multiplication of the two channels have different noise spectra. The superimposing on a time basis of the two information signals carrying a code or key which is dependent upon the frequencies of the transmitted pulses enhances the signal-to-noise ratio sufficiently to extend the range beyond that of more conventional sonar systems. If the multiplier 114 does not receive a signal from both channels in time coincidence, then no indication will appear on the display device 10. The system is sufficiently selective that it may employ extremely narrow information bands and yet retain the time information represented by the return echoes. It will be noted that the sweep oscillator 107 is controlled by the sweep voltage which is applied to terminal K and is transmitted by way of coupling condenser 120 to a wave-shaper 121 and thence to a variable voltage capacitor 122. The capacitor in the unit 122 is so controlled that the output frequency from the sweep oscillator varies linearly with time beginning with each cycle of the horizontal sweep voltage. The channel 101 and its associated components have been shown in block form to permit a general understanding of the mode of operation of the invention. The channel 100 has been illustrated in greater detail to clarify the operation.

There will now be given a brief description of the more detailed circuit diagrams of FIG. 2.

The channel 100 is connected to the input terminal of a scan-equalizing amplifier 104'. It is known, of course, that the output of the scan or playback heads 98 and 99 is non-linear with frequency. The peak is near the center frequency of 32 kilocycles for the above-identified range. The scan-equalizer amplifier 104' provides an output proportional to the input signal amplitude that is insensitive to frequency changes in the 15.89 to 49.0 kilocycle range. The equalizing network connected between the two stages 150 and 151 provides a varying collector load impedance for the first stage 150. The impedance and therefore the gain of this amplifier is low at the center frequencies where the scan head response is high, and high where the scan head response is low. The equalizer network also is designed to attenuate frequencies outside of the 15.89 to 49.0 kilocycle band. The second stage 151 provides amplification and isolates the equalizing network 152 from the succeeding modulator unit.

The modulator comprising a bridge network 153 mixes a variable frequency sweep signal from the sweep oscillator 107' with the 15.89-49.0 kilocycle signal at the output of the stage 151 to produce a 192 kilocycle intermediate frequency with information contained in the upper and lower side bands. The 192 kilocycle i.f. signal appears when the frequency of the signal at the output of stage 151 differs from the variable frequency signal from the sweep oscillator 107'. The sweep oscillator 107' sweeps through a frequency range of from 207.89 to 241 kilocycles, the amplitude of the i.f. signal being dependent upon the amplitude of the input signal.

The oscillator 107' provides a variable sweep frequency for mixing with the signal from the frequency multiplier to provide the 192 kilocycle i.f. Since the doppler shifts for the transmitted frequencies of 21.5 and 19.5 kilocycles are different for the same target velocity, two different sweep frequency ranges are required. In the system illustrated the sweep oscillators 107 and 107' are controlled by voltage variable silicon capacitors. In such capacitors it can be shown that the capacity varies in the following manner:

$$C = \frac{K}{\sqrt[4]{V}}$$

where
C is the capacitance;
K is the constant of proportionality; and
V is the externally applied voltage.

If L, the inductance of an L-C circuit, is constant, the oscillating frequency is expressed as follows:

$$f = \frac{1}{2\pi\sqrt{LC}} = \frac{K_1}{\sqrt{C}}$$

where $$K_1 = \frac{1}{2\pi\sqrt{L}}.$$

Therefore, with a voltage-dependent capacitor as the tuning element, the frequency will vary as follows:

$$f = k(V)^{\frac{1}{8}}$$

where $$k = K_1/\sqrt[8]{K}.$$

That is to say, for a linear frequency change the voltage applied to the silicon capacitor must have a fourth power characteristic. The silicon capacitors in the circuit 107′ comprise the two silicon units 160 and 161. Units 160 and 161 are connected in parallel with fixed capacitors 162 and 163 which in turn are connected in parallel with inductances 164 and 165.

The capacitors 160, 161, 162 and 163 together with the inductances 164 and 165 form a resonant tank circuit in the oscillator which is a modified Hartley circuit. The oscillator circuit, including the tank circuit, employs the units 166, 167 and 168.

The circuit 121′ provides an output signal which represents a fourth power function of the horizontal sweep voltage represented by waveform 61. It will be remembered that a sweep voltage having the latter waveform is the input voltage at terminal K′ of circuit 121′. This circuit serves to generate the desired fourth power curve by a number of straight line aproximations. The three transistors 170, 171 and 172 are differently biased so that as the input at terminal K′ increases linearly from zero, transistor 170 conducts first with transistors 171 and 172 cut off. When the input voltage reaches a desired level, transistor 171 begins to conduct. When the input voltage reaches a third preset level, transistor 172 begins to conduct. All three currents flow through the common collector load resistance 173 at the base of amplifier 174. The signal is then referred back to ground by the inverter amplifier 174.

The fourth power control voltage is then applied to the transistor 175 which forms a part of an emitter-follower circuit having a variable emitter resistor 176 for adjusting the initial D.C. bias on the variable capacitors 160 and 161. In oscillator 107′ regenerative feedback is provided through a capacitance 177 and the resistance 178. The output voltage from the oscillator is thus developed across the potentiometer 179 and applied to the base of the emitter-follower 168. The diode 183 and resistors 184 and 185 provide an amplitude-limiting control to give a linear voltage output from the oscillator 107′. The signal is then applied to the primary of a transformer 180 by way of a resistor. The signal from the secondary winding of the transformer 180 is applied by way of conductors 181 and 182 to the terminals of the modulator 153.

The pass band of the filter in amplifier 109′ is 192±2 kilocycles with the response down 20 decibels at 192±5 kilocycles. The signal presented to the wide band amplifier by the modulator 153 is a wide band of noise and signal in which weak signals are obscured. However, since only a 4 kilocycle portion of the band is passed, the signal-to-noise ratio is effectively increased. The reduction in the noise outside of the band also prevents overloading of the following stages.

The i.f. amplifiers 110′ and 112′ are located ahead of and following a narrow band-pass filter unit 111′. The i.f. amplifiers are of conventional design. Negative output from the detector 113′ is applied by way of channel 183 to the i.f. stages 110′ and 112′ for automatic gain control purposes.

The velocity resolution of this system depends upon the ability of the correlator-detector system of FIG. 2 to separate two adjacent signal frequencies. Therefore, the narrow band-pass filter 111′ should be as narrow as possible and yet wide enough that no signal can be overlooked. The minimum band width required to eliminate filter transient interference due to the sweeping rate may be shown to present the following limitations. For the most severe condition assume that the sweep oscillator frequency required to mix with the signal frequency to produce a 192 kilocycle signal occurs midway between the two signal pulses 20′ and 21′. Assume also that there must be coincidence of at least one-fourth of the signal pulses from the two channels. In this case the minimum band width of the filter 111′ can be shown to be of the order of 500 cycles. This corresponds with an "apparent" band width of 500×1.3=650 cycles. Referring this apparent band width to the input, this corresponds to a 16 cycle band width which will permit resolution of velocity of the target 11 to approximately 1.17 knots.

The system thus far described involves the use of two transmitted acoustic pulses of different frequencies. The return echoes of the two pulses are then separated into two channels. They are processed through an analyzer system which is sensitive to the signals related in a known manner to the frequencies of the transmitted acoustic pulses. An output signal is then provided only if evidence of return echo signals appears in both of the signal channels as applied to a multiplier. In one aspect, it is necessary, to carry out the invention as above described, that the spaced time segments of the received signal be superimposed as is effected through the offset of the record heads in the frequency multiplier-recorder system. It is preferable that the two time periods be adjusted precisely in dependence upon the time delay between the transmitted acoustic pulses.

Figure 3:
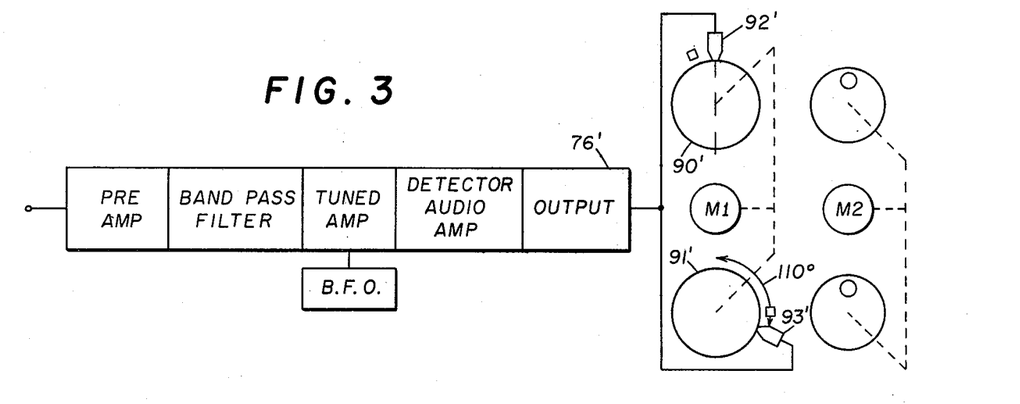
FIG. 3 illustrates one modification to be made in the system of FIGS. 1 and 2.

In contrast, however, a system such as shown in FIG. 3 may be employed. It will be noted that a single channel leads to the frequency multiplier. In use of this modification a pair of pulses will be transmitted by transducer 12 of the same frequency but otherwise actuated and controlled in the same manner as above described where pulses of different frequencies were employed. At the output of the unit 76′ the same signal is applied to both of the record heads 92' and 93'. By offsetting the record heads, the signals are adjusted in their relative time positions so that they are at least in part superimposed. By this means the differences in the noise spectra and the differences in the internal noise of the processing system are substantially cancelled or minimized by reason of the correlation techniques so that considerable enhancement of resolution is still effective utilizing the more simplified system of FIG. 3.

Figure 4:
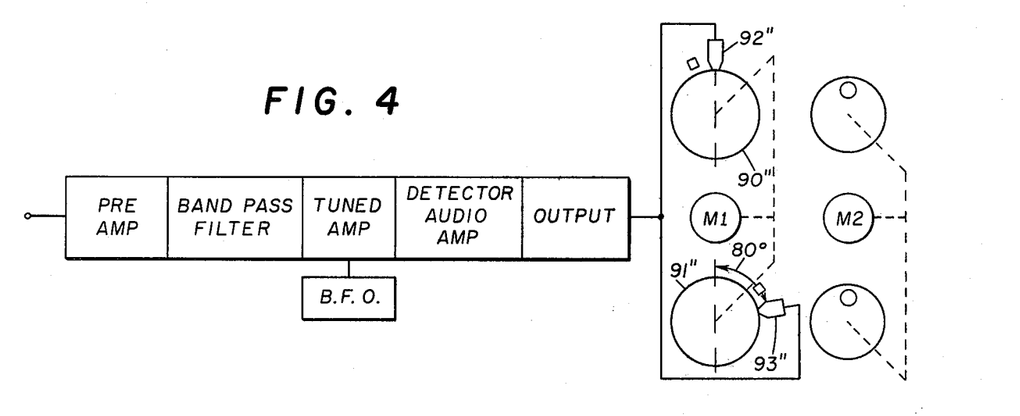
FIG. 4 illustrates a further modification to be made in the system of FIGS. 1 and 2.

The system may further be simplified as illustrated in FIG. 4. In this instance, however, the transmitted pulse is a single pulse uninterrupted over a period of 100 milliseconds. The return echo signal is recorded on two drums 90" and 91". The record heads 92" and 93" are offset so that the last half of the signal on drum 90" overlaps the first half of the signal on the second record drum 91". The noise spectrum in the first half differs from the noise spectrum in the latter half. Further, the internally generated noise generated by operation of the frequency multiplication system will be different. It has been found that such correlation of the last half with the first half of the pulse is effective in enhancing the signal-to-noise ratio.

The invention has been described above as involving the use of either one constant frequency pulse in each search cycle, two pulses of the same frequency but spaced in time one from another and two pulses spaced in time one from another and characterized by having different frequencies. It will be understood different pulsing programs may be adopted for carrying out the invention. The use of more than two pulses will be found desirable to further enhance the signal-to-noise ratio. Further, the greater the separation in the frequencies of the respective acoustic pulses, the greater will be the improvement in signal-to-noise ratio.

Figure 5:
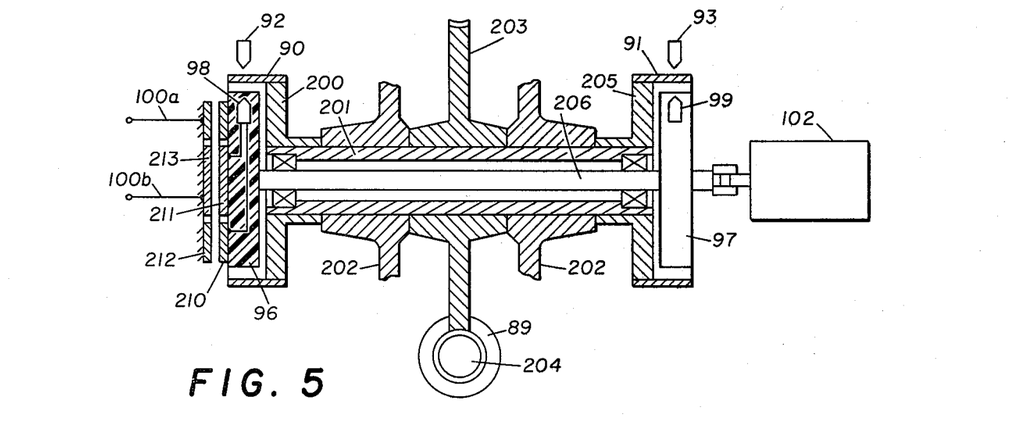
FIG. 5 illustrates a frequency multiplier unit.

By way of further explanation as to the operation of the frequency multiplying system, reference may be had to FIG. 5. FIG. 5 is a sectional view taken along the center axis of the recording and scanning system. Where consistent, the same reference characters have been given in FIG. 5 as in FIG. 2. The recording drum 90 is a relatively short cylinder of a magnetic recording medium such as may be formed from suitable nickel-cobalt alloys. The recording segment proper is a thin cylindrical membrane which is supported by a disk 200. The recording drum 90 extends from the surface of the disk 200 to form a cup-shaped aperture.

The recording head 92 (along with erase head 94, not shown) is mounted in fixed positions adjacent to the outer surface of the drum 90. The disk 200 is mounted on an outer shaft 201 which is journaled in bearings in the support elements 202. The outer shaft 201 is secured to a reduction gear 203. The motor 89 drives a worm gear 204 which meshes with the reduction gear 203 to drive the drum 90 relative to the record head 92. The second record drum 91 is similarly mounted on shaft 201 by a disk 205 so that it rotates with the drum 90.

An inner shaft 206 is provided which is journaled internally of the shaft 201. The shaft 206 carries the scan disk 96, supporting the same within the cup formed by the drum 90 and the disk 200. The scan disk 96 includes the scan head 98. The second scan disk 97 carrying the scan head 99 also is mounted on shaft 206 to scan signals recorded on drum 91. The central shaft 206 is driven by the motor 102. The drums 90 and 91 rotate in direction opposite the direction of rotation of the scan disks 96 and 97. In the specific embodiment above described the drums 90 and 91 were driven at the relatively low speed of 295 r.p.m., whereas the scan disks were driven in the opposite direction at a speed of 12,000 r.p.m.

The scan disk carrying head 98 includes on the outer face thereof a conductive ring 210 and a central conductive disk 211. The scan head 98 has its two terminals connected to the ring and to the disk 211, respectively. A stationary ring 212 and a stationary disk 213 are mounted on the housing or case in which the drum is mounted and serve as terminals for the capacitive transfer of signals from the scan head 98 to the signal channel 100. In FIG. 5 the conductors 100a and 100b comprise the signal channel 100 of FIG. 2. A similar capacitive coupling (not shown) is provided for the scan disk 97 so that the two signals may be reproduced for application by way of channels 100 and 101, FIG. 2, to the analyzing system. Thus, input signals are continuously recorded on the drums 90 and 91 and are continuously erased by the erase heads, such as heads 94 and 95, FIG. 2. The scan heads 98 and 99 continuously pick off the data recorded on the recording drum.

The ranging method and system of the present invention involve use of pulses of wave energy which are transmitted repeatedly, each having a predetermined dominant frequency. In principle at least the wave energy may be electromagnetic waves rather than sonic waves. Wave energy is sensed in the region of the transmitting location to generate received signals which may include components representative of return echoes of the transmitted pulses. One of the received signals is then shifted along a time base relative to the other to bring selected portions of the reflection components into time coincidence. There is then generated an output function dependent solely upon coincidence in occurrence in the pair of signals produced at the transmitting location having frequencies within narrow bands of frequencies. While extremely narrow bandwidths are ultimately utilized in the system, the doppler scanning technique employed permits retention of the information contained in the system while permitting sharp discrimination against noise components.

Having described the invention in connection with certain specific embodiments thereof, it is to be understood that further modifications may now suggest themselves to those skilled in the art and it is intended to cover such modifications as fall within the scope of the appended claims.

We claim:

1. In sonic ranging the method which comprises transmitting a first sonic pulse having a predominant frequency in the upper sonic range, transmitting a second sonic pulse after a time delay substantially less than the length of said first sonic pulse where said second sonic pulse has a frequency in the upper sonic range but substantially different than the frequency of said first sonic pulse, separately sensing the return echoes of the sonic pulses in two frequency bands to produce a pair of received signals, a first of which includes components representative of echoes of said first sonic pulse and the second of which includes components representative of echoes of said second sonic pulse with the frequencies of the echo components modified relative to the frequencies of said sonic pulses in dependence upon the relative velocities between the point of transmission thereof and the object producing echoes, separately recording said pair of received signals, reproducing the recorded signals to generate a pair of high frequency signals respectively representative of the first and second received signals with the fist high frequency signal shifted in time relative to the second high frequency signal by an amount representative of said time delay to bring like components thereof into time coincidence, generating a timing function which varies monotonically from a predetermined level occurring in known time relative to the instant of transmission of the second of said sonic pulses, generating a pair of reference signals which vary in frequency in dependence upon said timing function, separately mixing said reference signals and the first and second of said high frequency signals to produce side band components, filtering said side band components to generate a pair of output signals of narrow band width centered at frequencies respectively representative of the frequencies of said sonic pulses, separately detecting said output signals to produce a pair of demodulated signals, and from the product of said demodulated signals generating a signal appearing along a time scale dependent upon said timing function.

2. In sonic ranging the method which comprises transmitting a first sonic pulse having a predominant frequency in the upper sonic range, transmitting a second sonic pulse after a time delay substantially less than the length of said first sonic pulse where said second sonic pulse has a frequency in the upper sonic range but substantially different than the frequency of said first sonic pulse, separately sensing the return echoes of the sonic pulses in two frequency bands to produce a pair of received signals, a first of which includes components representative of echoes of said first sonic pulse and the second of which includes components representative of echoes of said second sonic pulse with the frequencies of the echo components modified relative to the frequencies of said sonic pulses in dependence upon the relative velocities between the point of transmission thereof and the object producing echoes, separately recording said pair of received signals, reproducing the recorded signals to generate a pair of high frequency signals respectively representative of the first and second received signals with the first high frequency signal shifted in time relative to the second high frequency signal by an amount representative of said time delay to bring them into time coincidence, modulating said high frequency signals with reference signals which vary in frequency repetitively and monotonically to produce side band components, filtering said side band components to generate a pair of output signals of narrow band widths centered at frequencies respectively representative of the frequencies of said sonic pulses, separately detecting said output signals to produce a pair of demodulated signals, and generating a signal representative of the product of said demodulated signals.

3. A doppler scanning system for determining the range rate of a reflecting object in an acoustic wave-transmitting medium which comprises means for transmitting a pair of pulses of acoustic frequencies from a sending station in said medium, means for detecting acoustic signals appearing in the region of said sending station during a time interval following transmission of said pulses to generate a pair of electrical signals which may include a combination of noise signals and signals representative of echoes from said object either at said acoustic frequencies or shifted therefrom in amounts dependent upon said range rate, means for multiplying the frequencies of all components of said electrical signals to produce a pair of high frequency signals, a pair of modulators for separately modulating each said pair of high frequency signals with modulation signals varying monotonically in frequency during each of a plurality of short successively occurring time segments within said time interval, a pair of high frequency filters respectively connected at their inputs to circuits leading from the outputs of said modulators and having band widths representative of acoustic frequency band widths of but a few cycles centered at frequencies representative of said acoustic frequencies to produce output pulses at the output of a given one of said filters only when the frequency of a signal from one of said modulators is within the pass band of said given one of said filters, a pair of demodulators, one connected to receive the output signals from each of said filters, a multiplier having two input channels connected to receive signals from said demodulators to generate a range rate signal representative of the product of the demodulated signals, and means for registering said range rate signal in correlation with the time variations in the frequencies of said modulation signals.

4. A doppler scanning system for determining the range rate of a reflecting object in an acoustic wave-transmitting medium which comprises means for transmitting a pair of pulses of acoustic frequencies $f_1$ and $f_2$ respectively from a sending station in said medium, means for detecting acoustic signals appearing in the region of said sending station during a time interval following transmission of said pulses to generate a pair of electrical signals, the first of which may include both noise components within a first band centered at frequency $f_1$ and components representative of echoes from said object either at said frequency $f_1$ or shifted therefrom in amount dependent upon said range rate and the second of which may include both noise components within a second band centered at frequency $f_2$ and components representative of echoes from said object either at said frequency $f_2$ or shifted therefrom in amount dependent upon said range rate, means for multiplying the frequencies of all components of said pair of electrical signals to produce a pair of high frequency signals, a pair of modulators for modulating said high frequency signals with modulation signals varying synchronously with and monotonically in frequency during each of a plurality of short successively occurring time segments within said time interval, a pair of high frequency filters respectively connected at their inputs to the outputs of said modulators and having band widths representative of acoustic frequency band widths of but a few cycles centered at frequencies representative of said acoustic frequencies $f_1$ and $f_2$ respectively, to produce a first output signal at the output of a first of said filters only when the frequency of a signal from the first of said modulators is within the pass band of said first of said filters and to produce a second output signal at the output of the second of said filters only when the frequency of a signal from the second of said modulators is within the pass band of said second of said filters, a pair of demodulators connected to receive the output signals from said filters, and means for registering the product of the demodulated output signals in correlation with the time variations in the frequency of said modulation signals.

5. A doppler scanning system for determining the range rate of a reflecting object in an acoustic wave-transmitting medium which comprises means for transmitting a pair of pulses of acoustic frequencies $f_1$ and $f_2$ respectively from a sending station in said medium, means for detecting acoustic signals appearing in the region of said sending station during a time interval following transmission of said pulses to generate a pair of electrical signals, the first of which may include both noise components within a first band centered at frequency $f_1$ and components representative of echoes from said object either at said frequency $f_1$ or shifted therefrom in amount dependent upon said range rate and the second of which may include both noise components within a second band centered at frequency $f_2$ and components representative of echoes from said object either at said frequency $f_2$ or shifted slightly therefrom in amount dependent upon said range rate, means for multiplying the frequencies of all components of said pair of electrical signals to produce a pair of high frequency signals, a pair of modulators for modulating said high frequency signals with modulation signals varying synchronously with and monotonically in frequency during each of a plurality of short successively occurring time segments within said time interval, a pair of high frequency filters respectively connected at their inputs to the outputs of said modulators and having band widths representative of acoustic frequency band widths of but a few cycles centered at frequencies related to said acoustic frequencies $f_1$ and $f_2$ respectively, to produce a first output signal at the output of a first of said filters only when the frequency of a signal from the first of said modulators is within the pass band of said first of said filters and to produce a second output signal at the output of the second of said filters only when the frequency of a signal from the second of said modulators is within the pass band of said second of said filters, a pair of demodulators connected to receive the output signals from said filters, and means responsive to the demodulated signals for generating a range rate signal representative of the product of said first output signal and said second output signal.

6. A doppler scanning system for determining the range and range rate of a reflecting object in an acoustic wave-transmitting medium which comprises means for transmitting a pair of acoustic pulses of acoustic frequencies $f_1$ and $f_2$ respectively from a sending station in said medium, means for detecting acoustic vibrations appearing in the region of said sending station during a time interval following transmission of said pulses to generate a pair of electrical signals, the first of which may include both noise components within a first band centered at frequency $f_1$ and components representative of echoes from said object either at said frequency $f_1$ or shifted therefrom an amount dependent upon said range rate and a second of which may include both noise components within a second band centered at frequency $f_2$ and components representative of echoes from said object either at said frequency $f_2$ or shifted slightly therefrom an amount dependent upon said range rate, means for multiplying the frequencies of all components of said pair of electrical signals to produce a pair of high frequency signals, means for shifting one of said high frequency signals along a time scale relative to the other by an amount proportional to the time difference between the pulses of said pair of acoustic pulses to bring any of said components into time coincidence, a pair of modulators for modulating said high frequency signals with modulation signals varying synchronously with and monotonically in frequency during each of a plurality of short, successively occurring time segments within said time interval, a pair of narrow band, high frequency filters respectively connected at their inputs to the outputs of said modulators and having band widths representative of acoustic frequency band widths of but a few cycles centered at frequencies related to said acoustic frequencies $f_1$ and $f_2$ respectively, to provide a first output signal at the output of a first of said filters only when the frequency of a signal from the first of said modulators is within the pass band of said first of said filters and to produce a second output signal at the output of the second of said filters only when the frequency of a signal from the second of said modulators is within the pass band of said second of said filters, a pair of demodulators connected to receive said first output signal and said second output signal from said filters respectively, a multiplier having input channels connected to receive signals from said demodulators to generate a range rate signal representative of the product of the demodulated signals, and means for registering the intensity of said range rate signal in a coordinate system having the time variations in the frequency of said modulation signals as one variable and the time length of said interval as the second variable.

* * * * *